United States Patent [19]

Thomsen et al.

[11] Patent Number: 4,594,406

[45] Date of Patent: Jun. 10, 1986

[54] POLYESTERS AND THEIR MANUFACTURE FROM ACIDS AND GLYCOL CARBONATES

[75] Inventors: Joelle R. Thomsen; David R. Fagerburg, both of Kingsport, Tenn.

[73] Assignee: Eastman Kodak Company, Rochester, N.Y.

[21] Appl. No.: 714,243

[22] Filed: Mar. 21, 1985

Related U.S. Application Data

[60] Division of Ser. No. 509,532, Jun. 30, 1983, Pat. No. 4,521,585, which is a continuation-in-part of Ser. No. 405,795, Aug. 6, 1982, abandoned, which is a continuation-in-part of Ser. No. 291,609, Aug. 10, 1981, abandoned.

[51] Int. Cl.$^4$ .............................................. C08G 63/00
[52] U.S. Cl. ................................. 528/271; 528/308; 528/308.3; 528/370
[58] Field of Search .................... 528/271, 308, 308.3, 528/370; 525/418

[56] References Cited

U.S. PATENT DOCUMENTS 4,521,585 6/1985 Thomsen et al. .................. 528/271

Primary Examiner—Harold D. Anderson
Attorney, Agent, or Firm—Donald W. Spurrell; Daniel B. Reece, III

[57] ABSTRACT

Poly(ethylene terephthalate), poly(1,4-cyclohexanedicarboxylate), poly(ethylene isophthalate), poly(ethylene naphthalate), their copolymers with each other and with modifying aliphatic dicarboxylic acids, and substituted glycol repeat unit modifications thereof are produced from prepolymer (oligomer) obtained from the esterification of the acid or acids with ethylene carbonate or substituted ethylenecarbonate in the presence of one or more amines compounds selected from trialkylamines, tetraalkyldiamines, N-alkylated heterocyclic amines, and certain quaternary ammonium salts, employing certain mole ratios of ethylene carbonate and substituted ethylene carbonate to the diacid. The prepolymer is formed in an unusually short time and the final polyester of high I.V. exhibits improvement in such properties as desirable light color and low etherglycol level.

3 Claims, No Drawings

POLYESTERS AND THEIR MANUFACTURE FROM ACIDS AND GLYCOL CARBONATES

This is a divisional of application Ser. No. 509,532 filed on June 30, 1983, now U.S. Pat. No. 4,521,585 which is a continuation-in-part application of U.S. Ser. No. 405,795, filed Aug. 6, 1982, now abondoned, which is a continuation-in-part application of U.S. Ser. No. 291,609 filed Aug. 10, 1981, now abandoned.

This invention concerns an improved process for the manufacture of prepolymer, also known in the art as precondensate, oligomer or monomer, of inherent viscosities of from about 0.008 to about 0.20, preferably 0.08 to 0.1, and the manufacture therefrom of polyesters such as poly(ethyleneterephthalate), poly(ethylene-1,4-cyclohexanedicarboxylate), poly(ethyleneisophthalate), poly(ethylene-2,6-naphthalene dicarboxylate), their copolyesters, and modifications thereof with aliphatic dicarboxylic acids, and such polyesters having alkyl or cyclohexyl substituted glycol repeat units, of molding, fiber forming or film forming inherent viscosity, i.e. from about 0.4 to about 1.2.

The prepolymer is obtained in accordance with the present invention from the esterification of one or more of terephthalic acid (TPA), 1,4-cyclohexanedicarboxylic acid (CHDA), isophthalic acid (IPA), or any naphthalenedicarboxylic acid (NDA), preferably naphthalene-2,6-dicarboxylic acid, but including, e.g., 1,3-, 1,4-, 2,5-, and 2,7- depicted by the general formula below, and up to about 50 mole percent, preferably up to about 15 mole percent, based on total moles of acid reactant of an aliphatic dicarboxylic acid component (ADAC) consisting of one or a mixture of aliphatic dicarboxylic acids of from 4 to 20 carbons (2–18 carbons in the hydrocarbon chain), with ethylene carbonate (EC) or substituted ethylene carbonate (SEC), or mixtures thereof, in the presence of an amine component defined below. In the present process the mole ratio EC:TPA, EC:CHDA, and EC:NDA is from about 1 to about 2, preferably not exceeding about 1.8, and most preferably from 1.1 to 1.5, the mole ratio EC:IPA is from about 1 to about 1.8, and preferably from 1.1 to 1.5, the mole ratio of EC:ADAC is from about 1 to about 2, preferably from 1.1 to 1.5, and the mole ratio of SEC to each of the diacids is from about 1.25 to about 3.0, preferably from 1.3 to 2.5. It is noted that when more than one acid and/or carbonate is employed, the mole ratios given above apply in proportion to the molar percentages of the acids and/or carbonates present to which the ratios apply, without regard to any apparent excess or deficiency of any particular acid or carbonate with respect to any other reactant.

The final polymer (polycondensate) prepared according to the present process exhibits improvements in color and/or reduction of the by-product ether-glycol level, for example, diethylene glycol (DEG) (the ether-glycol being in reacted form in the polyester chain), and the adverse effects associated therewith. It is noted that the higher ether-glycol levels typically lower the glass transition temperatures and melting points of polyesters and adversely affects, for example, their gas and water vapor barrier properties, rendering them unsuitable for certain packaging material applications. Also, in the present process, the prepolymer can be made in a much shorter period of time than possible, e.g., by the transesterification of dimethyl terephthalate or dimethyl isophthalate with ethylene glycol (EG). The polyesters prepared from the present prepolymers are especially suitable for use in fibers, beverage bottles, food packaging and the like.

In regard to one advantage of the present invention, published literature preparations of polyesters from glycols containing two differently reactive hydroxyl functionalities such as 1,2-propanediol having one primary hydroxyl and one secondary hydroxyl, indicate that the overall reaction is a long and difficult one. For example, preparation of poly-(1,2-propyleneterephthalate) from dimethyl terephthalate (DMT) and 1,2-propanediol is carried out at atmospheric pressure due to the low boiling point of 1,2-propanediol and an apparent low reactivity. This transesterification process requires about twice the time as the reaction of DMT with ethylene glycol. Moreover, presumably due to the majority of the free hydroxyl groups being secondary in the prepolymer, the polycondensation must be carried out at relatively low temperatures of less than about 250° C. and preferably about 240° C. which results in very slow polycondensation. The use of higher temperatures for such polycondensations appears to cause dehydration of a sufficient number of end groups to inactivate the polymer segments after only a fraction of the desired molecular weight is attained. Likewise, preparation of such polymers from terephthalic acid has proven difficult because of low reactivity at the temperatures required to avoid glycol distillation, and similarly, preparation from diacid chlorides suffers from expensive intermediates and solvent drying requirements for achieving satisfactorily high molecular weights.

In accordance with the present invention, we have discovered that the above-mentioned preparation and final polymer problems may be overcome by reacting the dicarboxylic acid with a cyclic ethylene carbonate having the formula

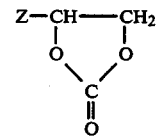

wherein Z is hydrogen, cyclohexyl or alkyl, branched or straight, of 1-6 carbons, provided that the carbon attached to the carbonate ring contains at least one hydrogen atom bound to it. Exemplary of such carbonates are propylene carbonate, 1,2-butylene carbonate, 1,2-hexylene carbonate, cyclohexylethylene carbonate, and isopropylethylene carbonate. The alkyl carbonates may all be prepared from the corresponding 1,2-diols and a dialkyl carbonate such as diethyl carbonate, or from the epoxide and carbon dioxide. The preparation, for example, of ethylene carbonate from ethylene oxide and $CO_2$ is described in U.S. Pat. No. 4,117,250.

Many processing agents, including multivalent metals, trialkylamines, and certain quaternary ammonium halides are known in the prior art for use in transesterifications or direct esterifications, but these agents in general either do not give good color when applied to the reaction of the above acids and carbonates, are not taught for such reactions, or are not disclosed as having a catalytic effect thereon. See, for example, U.S. Pat. Nos. 3,549,692 and 4,266,046; Ger. Offen. 1,952,094; JCS, Perkin 1977, pp 1266–71; and Japanese Pat. Nos. J 74 06,195 and J 74 75,516.

We have found that the addition of an amine component selected from one or more of trialkylamines, preferably triethylamine, tripropylamine and tributylamine, tetraalkyl nitrogen substituted diamines, N,N'-dialkyl piperazine, N-alkyl piperidine, and certain quaternary ammonium salts defined below, to the reaction mixture comprising one or more of TPA, IPA, CHDA, or NDA and EC and/or SEC results in unusually rapid prepolymer or oligomer formation and in improvements in the final polymer, i.e., inherent viscosities of above about 0.40 with, for example in the EC reaction, DEG levels below about 1.0.

The trialkylamines useful herein have the formula $R_3N$ wherein the R alkyl groups are all the same or mixed and are linear or branched of up to about 18 carbons. Preferred are those wherein each R is selected from ethyl, propyl and butyl, and most preferably each R is butyl. It is desirable, in most cases, to employ trialkylamines having boiling points below the desired polycondensation temperature, i.e., below about 280°–285° C. in order to recover said amines for recycle. The tetraalkyl nitrogen substituted diamines have the formula $R^2R^3N-R^1-NR^4R^5$ wherein $R^1$ is straight or branched alkylene of 1-8 carbons, and each of $R^2$, $R^3$, $R^4$ and $R^5$ is independently selected from straight or branched alkyl of 1-8 carbons. The alkyl moieties $R^2$ and $R^3$ of the N,N'-dialkyl piperazine

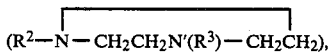

and the N-alkyl piperidine

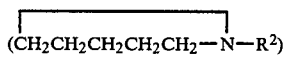

are as defined above.

The quaternary ammonium salts (the term "salts", herein includes counterpart bases) useful herein have the general formula $(R^6)_4N^+X^-$, wherein each $R^6$ group is independently selected from linear or branched alkyl of 1-18 carbons, and one of which may be benzyl, and wherein the counterion $X^-$ may be hydroxide or a carboxylate anion from a carboxylic acid such as acetic, propionic, benzoic, and the like. It is preferred that each $R^6$ group not exceed 8 carbons, and it is particularly preferred that three of the $R^6$ groups are methyl and the other is a higher alkyl not exceeding 8 carbons, most preferably ethyl or butyl. Also particularly preferred is that each $R^6$ is ethyl or butyl, and also that three $R^6$ groups are ethyl and the remaining $R^6$ is benzyl. Such salts generally give excellent color in the final polymer.

A preferred group of specific amine components comprises triethylamine, tripropylamine, tri-n-butylamine, ethyltrimethylammonium hydroxide, tetraethylammonium hydroxide, benzyltriethylammonium hydroxide, propyltrimethylammonium hydroxide, butyltrimethylammonium hydroxide, tetraethylammonium bromide, tetraethylammonium acetate, tetrabutylammonium hydroxide, and benzyltriethylammonium hydroxide.

Concentrations of the amine component as low as about 0.05 mole % based on total EC or SEC moles generally provide a substantial rate increase over the uncatalyzed reaction. Concentrations of these catalysts of up to about 5.0 mole % or higher based on total EC or SEC moles can also be used and show even larger rate increases although a diminishing effect is seen after a point. The preferred range for the trialkylamine and N-alkyl piperidine is 0.5 to 2.5 mole % for the ammonium salt is 0.25 to 1.0 mole %, and for the tetraalkyldiamines and dialkyl piperazines is 0.25 to 1.25 mole %.

As indicated above, another aspect of this invention involves the EC:TPA, EC:CHDA, EC:IPA, EC:NDA, and to a lesser extent, the EC:ADAC molar ratios used for the reaction. It has been found that the ratios set forth above are suitable to give products having one or more desirable properties such as light color, low etherglycol, and high final polymer I.V. Ratios substantially above those limits usually will give deeper color and higher ether-glycol levels even though the esterification reaction is considerably accelerated.

As aforesaid, in the polyester preparations, aliphatic dicarboxylic acids can be substituted for up to about 50 mole percent of the TPA, IPA, NDA, or CHDA to obtain certain desirable properties associated with such copolymers. Such aliphatic dicarboxylic acids include adipic, pimelic, suberic, azelaic, sebacic, and dodecanedioic acids or hetero atom containing diacids such as oxydiacetic acid. In general, for packaging and similar applications, the mole percent modification by such diacids is preferably up to about 15 mole percent based on total moles of acid.

The esterification reaction giving the prepolymer having an I.V. of from about 0.008 to about 0.20 is carried out preferably in an inert atmosphere and at a temperature of from about 150° C. to about 265° C., preferably 200° C. to 240° C., with the evolution of carbon dioxide. The preparation of the prepolymer is essentially complete when $CO_2$ evolution ceases as the result of complete reaction of the carbonate with the diacid. This prepolymer is a mixture of low molecular weight oligomers which have a statistical distribution of repeating units of the type, for example, in the case of TPA and EC,

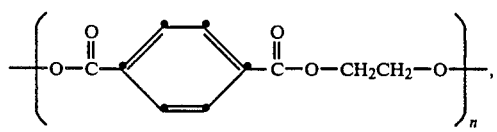

where n is usually not more than two or three. The polycondensation reaction to build the I.V. to the desired level is then carried out by any of a wide variety of known processes such as at temperatures of from about 180° C. to about 290° C., but usually preferably from about 240° C. to about 285° C., under vacuum in the melt, or by solid state in a fixed-bed reactor as in U.S. Pat. No. 4,161,578 incorporated herein by reference, at a temperature of from about 200° C. to below the sticking point of the polymer and in the presence of a suitable catalyst, e.g., titanium (as the tetraisopropoxide) or antimony (as the triacetate) as a slurry in ethylene glycol, in a concentration, for example, from about 50 to about 400 ppm of Sb or 10-200 ppm of Ti based on the theoretical final polymer weight. The terms "sticking point" as used herein denotes temperatures which range from where the polymer particles just begin to tend to stick to each other to where sufficient sticking and agglomeration of the particles occurs to seriously inhibit the necessary flow of polymer from the solid-stating reactor. The term "below" therefore, actually can encompass temperatures at which some sticking and agglomeration occurs, but which are still at an operable level.

In the esterification reaction, it is not necessary for the reaction mixture to become clear prior to raising the temperature required for polycondensation, particularly if the mole ratio of carbonate to diacid is <2. It is, however, desirable in all cases for the melt to become clear for several minutes prior to beginning the polycondensation in order to achieve greater clarity in the final polymer.

The prepolymer aspect of the present invention is defined as the process for preparing prepolymer of an I.V. of from about 0.008 to about 0.20, having the same or different repeating units of the formula $$-O-\overset{O}{\underset{\|}{C}}-A-\overset{O}{\underset{\|}{C}}-O-CH_2\overset{Z}{\underset{|}{CH}}- \text{ wherein A is}$$

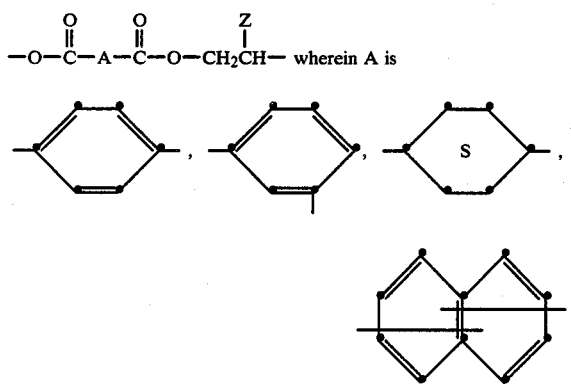

or mixtures thereof in any proportion, and wherein up to about 50 mole percent of A comprises the hydrocarbon chains of 2-18 carbons of one or more aliphatic dicarboxylic acids of a modifying acid component (ADAC) consisting of one or a mixture of aliphatic dicarboxylic acids of 4-20 carbons, and Z is H or a group selected from cyclohexyl and straight or branched alkyl of 1-6 carbons, provided that the carbon of said Z group which is attached to the main chain contains at least one hydrogen atom bound to it, said process comprising reacting one or a mixture of carbonate reactants of the formula

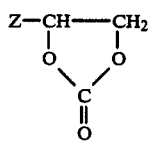

with one or a mixture of terephthalic acid (TPA), 1,4-cyclohexanedicarboxylic acid (CHDA), isophthalic acid (IPA), or naphthalenedicarboxylic acid (NDA), and up to about 50 mole percent of said aliphatic dicarboxylic acid component (ADAC), at a temperature of from about 150° C. to about 250° C., wherein the mole ratio of the ethylene carbonate (EC) to TPA, CHDA, or NDA is from about 1 to about 2, the mole ratio of EC:IPA is from about 1 to about 1.8, the mole ratio of EC:ADAC is from about 1 to about 2, and the mole ratio of the substituted ethylene carbonate to each of the acids is from 1.25 to 3.0, and wherein the reaction is carried out in the presence of from about 0.05 mole % to about 5.0 mole % based on total moles of carbonate reactant of an amine component selected from one or a mixture of: trialkylamines having the formula $R_3N$ wherein each R is an independently selected alkyl group, linear or branched of 1 to 18 carbons; tetraalkyl nitrogen substituted diamines having the formula $R^2R^3N-R^1-NR^4R^5$ wherein $R^1$ is straight or branched alkylene of 1-8 carbons, and each of $R^2$, $R^3$, $R^4$ and $R^5$ is independently selected from straight or branched alkyl of 1-8 carbons;

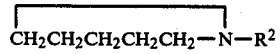

wherein $R^2$ and $R^3$ are as defined above; and quaternary ammonium salts having the formula $(R^6)_4N^+X^-$, wherein each $R^6$ group is independently selected from linear or branched alkyl of 1-18 carbons, and one of which can be benzyl, and wherein $X^-$ is hydroxide or a carboxylate anion.

The inherent viscosities (I.V.) of the prepolymer and polycondensate (final polymer) herein and in the examples below are determined according to ASTM D2857-70 procedure, in a Wagner Viscometer of Lab Glass, Inc. of Vineland, New Jersey, having a ½ ml. capillary bulb, using a polymer concentration of 0.5% by weight in 60/40 by weight of phenol/tetrachloroethane. The procedure is carried out by heating the polymer-solvent system at 120° C. for 15 minutes, cooling the melt to 25° C. and measuring the time of flow at 25° C. The I.V. is calculated from the equation $$\{n\}^{25°\ C.}_{0.50\%} = \frac{\ln \frac{t_s}{t_o}}{C}$$

where:
{n}=inherent viscosity at 25° C. at a polymer concentration of 0.50 g/100 ml. of solvent;
ln=natural logarithm;
$t_s$=sample flow time;
$t_o$=solvent-blank flow time; and
C=concentration of polymer in grams per 100 ml. of solvent=0.50.

The units of the inherent viscosity in all examples given below are in deciliters/gram.

The invention can be further understood by reference to the following specific examples which are not intended to limit the invention, but merely to illustrate the same.

EXAMPLE 1

This example employs triethylamine to produce polyester of good color and low DEG level.

In a flask fitted with stirrer, $N_2$ inlet, and a take-off for $N_2$ and volatile products, were placed 83 g. (0.5 mol) of TPA, 88 g. (1.0 mol) of EC and 2.49 g. of $Et_3N$. The mixture was stirred under $N_2$ with the flask placed in a molten metal bath at 200° C., and the temperature gradually raised to 230° C. After 40 minutes, the melt had cleared and $CO_2$ evolution essentially ceased. The temperature of the metal bath was then raised to 280° C. and 250 ppm of Sb catalyst added as the triacetate (calculated as Sb°). Vacuum was applied and the pressure held at about 0.1 torr for 60 minutes after which the system was repressurized with nitrogen and the polymer allowed to cool and crystallize. An I.V. of 0.59 was obtained and the polymer had a CDM+b color value of 3. Analysis by conventional hydrolysis/gas chromatography gave a DEG content of 0.46 wt. %.

EXAMPLE 2

This example employs tributylamine to produce a polyester having good color and a low DEG level.

Into the apparatus of Example 1 were placed 83.0 g. (0.5 mol) of TPA, 66 g. (0.75 mol) of EC and 2.49 g. of tributylamine. The conditions of Example 1 were followed except that the esterification was allowed to proceed for about 70 min. An I.V. of 0.62 was obtained and the polymer had a +b color value of 3.6. Analysis by hydrolysis/gas chromatography gave a DEG content of 0.58 wt. %.

EXAMPLE 3

This example illustrates the effect of various EC:TPA molar ratios, i.e., 2, 2.4 and 4.0, on the color and DEG levels of the resultant polyester.

In three separate runs made according to Example 1, each using 41.5 g. of TPA (0.25 mol) and 0.2 g. of $Et_3N$, EC was added in the following amounts: (A) 44.0 g. (EC:TPA=2), (B) 52.5 g. (EC:TPA=2.4), and (C) 88.0 g. (EC:TPA=4.0). The required esterification times were obtained by visual determination of the time when the melts became clear. The polyesters were all analyzed by hydrolysis/gas chromatography for DEG, and the color inspected visually to give the results shown below:

| Sample | Required Esterification Time, Hr. | Wt. % DEG | Color |
|---|---|---|---|
| (A) | 3.0 | 0.95 | Off-white |
| (B) | 2.6 | 3.9 | Tan |
| (C) | 1.0 | 21.8 | Dark brown |

EXAMPLE 4

In this example using the conditions and apparatus of Example 1, 0.4 g. of sodium acetate was used as taught in Ger. Offen. 1,952,094. The amounts of EC and TPA used for the reaction were twice those of sample (A) of Example 3 and the triethylamine was omitted. The melt did not become clear even after about five hours at 200° C. The final polymer had a 0.57 I.V., a+b color value of 12.6 and contained 2.4 wt. % DEG.

EXAMPLE 5

This example compares the present invention with the use of imidazole according to U.S. Pat. No. 3,549,692.

Test-tube size runs were made each using 4.98 g. of TPA and 5.28 g. of EC. To one sample was added 0.15 g. of triethylamine (sample 1) and to the other 0.0115 g. of imidazole (sample 2). The tubes were heated in a $N_2$ atmosphere at 220° C. and both samples were in solution in about 50 minutes. Sample (2) had much more color (yellow-brown) than sample 1. After polymerizing as in Example 1 employing 250 ppm Sb added as the acetate, the color difference was much more pronounced in the polymers.

EXAMPLE 6

This example using the apparatus of Example 1 illustrates the use of a quaternary ammonium salt to produce polyester of good color and low DEG.

In the apparatus were placed 83.0 g. of TPA, 88.0 g. of EC and 0.29 g. of tetraethylammonium hydroxide (as a 25% by weight solution in methanol). The whole was stirred under $N_2$ and placed in the molten metal bath at 200° C. After 80 minutes, the melt had cleared and $CO_2$ evolution had essentially ceased. The temperature of the metal bath was raised to 285° C., 250 ppm Sb catalyst added (as the acetate) and vacuum applied to a pressure of about 0.4 torr for 60 minutes to polycondense the product, after which the system was repressurized under $N_2$. The I.V. of the final polymer was 0.53 and had a+b color value of 4.0 and an Rd value of 84.0. The DEG level was determined by hydrolysis/gas chromatography to be 0.49 wt. %.

The above CDM +b color measurements (connoted +b) are obtained on a Gardner Color Difference Meter, the Rd value being a measure of the light reflectivity of the polymer, the higher the value the more reflectivity, and the +b value being a measure of the yellowness of the polymer, the higher the value the deeper the yellow.

The following Examples 7-12 illustrate the EC/IPA aspect of the present invention. In these examples the times necessary for preparing the prepolymer were again obtained by visual observation of when the melt became clear. The apparatus employed in these examples was that used in Example 1.

Example 7 shows a superior polymer having a good I.V. and low DEG obtained by use of the present invention in preparing the prepolymer at relatively low temperature and short reaction time.

Example 8 shows a conventional transesterification employing DMI and EG which takes a much longer time and higher temperature to prepare the prepolymer. The resulting final polymer, moreover, has excessively high DEG content.

Example 9 shows a conventional direct esterification with IPA and EG again requiring longer times and higher temperatures. The resulting final polymer has excessively high DEG also.

Example 10 shows the same reaction as Example 9 but employing a much higher EG:IPA molar ratio in order to assist the esterification, and employing the time-temperature profile of Example 7. The resulting polymer had a slightly improved DEG level but a totally unacceptable low I.V.

EXAMPLE 7

Into the flask were weighed 83.0 g (0.50 mol) of isophthalic acid, 52.8 g (0.60 mol) of ethylene carbonate, and 5.55 g (0.03 mol) of tri-n-butylamine. The mixture was stirred under $N_2$ with the flask immersed in the metal bath held at 190° C. for 1 hr. and 45 min. The temperature of the bath was then raised to 280° C. and 0.6 ml of a titanium catalyst as acetyl trisopropyl titanate solution (1.76 wt. % Ti) in n-butanol was added. Vacuum was applied and the melt polycondensed for 45 minutes at 0.15 torr. The metal bath was removed at the end of this time and the apparatus repressurized with nitrogen and allowed to cool to solid polymer. The clear, yellow polymer had an I.V. of 0.806 and by hydrolysis/gas chromatography a DEG content of 0.41 wt. %.

EXAMPLE 8

The reactants were 97.0 g (0.5 mol) of dimethylisophthalate (DMI), 68.2 g (1.1 mol) of ethylene glycol, and 0.6 ml of the titanium catalyst solution of Example 7.

After stirring the mixture for 2 hrs. with the flask immersed in the metal bath held at 190° C., and then at 220° C. for 1 hour, the bath temperature was raised to 280° C. Upon reaching 280° C., a vacuum was applied to the flask to achieve a pressure of 0.3 torr. Polycondensation for 50 min. produced a light yellow polymer of 0.849 I.V. which analyzed for 5.89 wt. % DEG.

EXAMPLE 9

The reactants were 83.0 g (0.50 mol) of isophthalic acid and 37.2 g (0.60 mol) of ethylene glycol. The mixture was stirred with the flask held in a 190° C. metal bath for four hours after which the bath temperature was raised to 230° C. The melt became clear after about 50 minutes at this temperature. The bath temperature was then raised to 280° C., titanium catalyst added as in Example 7 and the melt polycondensed for 45 minutes at a pressure of 0.1 torr. The resulting clear, yellow polymer had an I.V. of 0.787 and DEG content of 2.16 wt. %.

EXAMPLE 10

The catalyst and reactants for the esterification were the same as for Example 9 except that 68.2 g (1.1 mol) of ethylene glycol was used. The resulting polymer after 45 minutes polycondensation at 280° C. and 0.1 torr pressure had an I.V. of only 0.205 and contained 1.89 wt. % DEG.

EXAMPLE 11

This example illustrates that the use of tri-n-butylamine ($Bu_3N$) is alone not sufficient when applied to the IPA-EG system of Example 9, to yield a combination of good I.V. and low DEG.

Parallel runs were made repeating Example 9 but with the second of the runs having 1.2 g of $Bu_3N$ added for the esterification. Using the time-temperature profiles of Example 9, the resulting polymers analyzed as follows without $Bu_3N$, I.V. was 0.791, and DEG was 1.93 wt. %; with $Bu_3N$, I.V. was 0.431, and DEG was 0.37 wt. %. Thus, although the DEG level was suppressed, the I.V. was unacceptably low, and the polymer color with added $Bu_3N$ was dark.

EXAMPLE 12

This example illustrates the effect of increasing the mol ratio of EC/IPA on color and DEG level employing the apparatus and reaction conditions of Example 1.

Reactions were run at the EC/IPA mol ratios of 2.0, 1.80, 1.5, and 1.2 using 0.4 mol % $Et_4N^+Br^-$ as the catalyst for the esterification. The resultant polymers were analyzed and tabulated as shown below:

| Mol Ratio EC/IPA | I.V. | DEG, Wt. % | Color |
|---|---|---|---|
| 2.00 | 0.740 | 4.50 | Dark Brown |
| 1.80 | 0.670 | 0.81 | Yellow |
| 1.50 | 0.882 | 0.76 | Yellow |
| 1.20 | 0.864 | 0.69 | Yellow |

EXAMPLE 13A

This example illustrates the preparation of poly(1,2-propylene terephthalate) by the method of this invention.

Terephthalic acid, 83.0 g. (0.5 mol), propylene carbonate, 153 g. (1.5 mol), and $Bu_3N$, 13.92 g. (0.075 mol) were combined in a 500-ml. single neck round bottom flask fitted for volatiles removal, $N_2$ introduction, and with a stainless steel stirrer. The flask was immersed in a molten metal bath held at 220° C. After about 40 minutes the melt was clear. After 70 minutes, the bath was raised to 255° C., titanium tetraisopropoxide catalyst added (about 100 ppm Ti by weight) and a vacuum applied to a pressure of 0.2 torr. The polycondensation was carried out for 110 minutes. The vacuum was then released and the product cooled under nitrogen. The clear polymer had an I.V. of 0.67, a carboxyl number of 29.7 eq/$10^6$ g., and a Tg by DSC of 93° C.

EXAMPLE 13B

This example illustrates the preparation of the above polymer of 13A by the previously known preferred method.

Dimethyl terephthalate, 97.0 g. (0.5 mol), propylene glycol, 114 g. (1.5 mol) and enough titanium alkoxide and zinc acetate catalyst solutions to yield 100 ppm Ti by wt. and 130 ppm Zn by wt. in the final polymer were combined in a flask fitted as described above. The metal bath was set at 180° C. and held there for 2 hours, then raised to 190° C. for 2 hours, and then raised to 220° C. for 1 hour. The bath was then raised to 240° C. and the melt polycondensed by application of vacuum to a pressure of 0.3 torr. After 90 minutes, the product had an I.V. of 0.39, a carboxyl content of 35.5 eg/$10^6$ g. of polymer, and a Tg of 93° C. (DSC).

EXAMPLE 14

This example illustrates the effects of differing mole ratios of propylene carbonate and reaction times on the polymers, showing that a wide latitude is permissible.

In all cases, the terephthalic acid was used in the amount of 83.0 g. (0.5 mole). The propylene carbonate was ratioed to this and the $Bu_3N$ catalyst was held at 5 mol % of the carbonate present. The apparatus was that of Example 1.

| Carbonate/TPA Mole Ratio | Esterification Time At 220° C. in Min. | Time in Min. | Temp., °C. | I.V. | Carboxyl no., 6 eq/10 g. | Tg, °C. (DSC) |
|---|---|---|---|---|---|---|
| 1.25 | 120 | 110 | 255 | 0.46 | 19.6 | 96 |
| 1.5 | 120 | 70 | 255 | 0.49 | 31.9 | 92 |
| 1.75 | 120 | 90 | 255 | 0.50 | 25.6 | 94 |
| 2.50 | 75 | 100 | 255 | 0.65 | 30.4 | 94 |
| 3.00 | 70 | 110 | 255 | 0.67 | 29.7 | 93 |

EXAMPLE 15

This example illustrates the preparation of poly (1,2-butylene terephthalate). Terephthalic acid, 41.5 g. (0.25 mol), butylene carbonate, 58.0 g. (0.50 mol) and $Bu_3N$, 4.62 g. (0.025 mol) were combined in a flask as an Example 1. After the mixture was stirred for 2 hours at 225° C. bath temperature, the temperature was raised to 260° C., titanium tetraisopropoxide catalyst (100 ppm Ti by wt.) added and the melt polycondensed for 1 hour 20 minutes at 0.1 torr pressure. The clear polymer had an I.V. of 0.44.

The invention has been described in detail with particular reference to preferred embodiments thereof, but it will be understood that variations and modifications can be effected within the spirit and scope of the invention.

We claim:

1. The process for preparing polyester of good color, an inherent viscosity (I.V.) of from about 0.4 to about 1.2 determined according to ASTM D2857-70 procedure, in a Wagner Viscometer of Lab Glass, Inc. of Vineland, New Jersey, having a ½ ml. capillary bulb, using a polymer concentration of 0.5% by weight in 60/40 by weight of phenol/tetrachloroethane, and a reacted ether-glycol level of below about 1.0% by weight, comprising preparing prepolymer of an I.V. of from about 0.008 to about 0.20 having the same or different repeating units of the formula

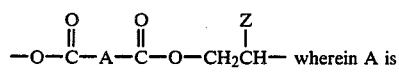 wherein A is

,

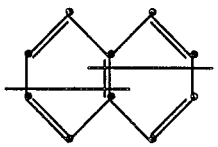

or mixture thereof in any proportion, and wherein up to about 50 mole percent of A comprises the hydrocarbon chains of 2-18 carbons of one or more aliphatic dicarboxylic acids of a modifying acid component (ADAC) consisting of one or a mixture of aliphatic dicarboxylic acids of 4-20 carbons, and Z is H or a group selected from cyclohexyl or straight or branched alkyl of 1-6 carbons, provided that the carbon of said Z group which is attached to the main chain contains at least one hydrogen atom bound to it, by reacting one or a mixture of compounds of the formula

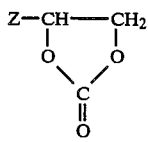

with one or a mixture of terephthalic acid (TPA), 1,4-cyclohexanedicarboxylic acid (CHDA), isophthalic acid (IPA), or naphthalene dicarboxylic acid (NDA), and up to about 50 mole percent of said aliphatic dicarboxylic acid component (ADAC) at a temperature of from about 150° C. to about 250° C., wherein the mole ratio of the ethylene carbonate (EC) to TPA, CHDA, or NDA is from about 1 to about 2, the mole ratio EC:IPA is from about 1 to about 1.8, the ratio EC:ADAC is from about 1 to about 2, and the mole ratio of the substituted ethylene carbonate to each of the acids is from 1.25 to 3.0 and wherein the reaction is carried out in the presence of from about 0.05 mole % to about 5.0 mole % based on total moles of carbonate reactant of an amine component selected from one or more of: trialkylamines having the formula $R_3N$ wherein each R is an independently selectd alkyl group, linear or branched of 1 to 18 carbons: tetraalkyl nitrogen substituted diamines having the formula $R^2R^3N-R^1-NR^4R^5$ wherein $R^1$ is straight or branched alkylene of 1-8 carbons, and each of $R^2$, $R^3$, $R^4$ and $R^5$ is independently selected from straight or branched alkyl of 1-8 carbons:

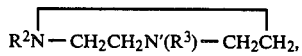

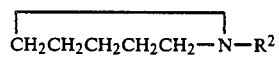

wherein $R^2$ and $R^3$ are as defined above: quaternary ammonium salts having the formula $(R^6)_4N^+X^-$, wherein each $R^6$ group is independently selected from linear or branched alkyl of 1-8 carbons, or one of which is benzyl, and wherein $X^-$ is hydroxide or a carboxylate anion, and thereafter polycondensing said prepolymer to produce said polyester.

2. The process of claim 1 the polycondensation is carried out in a stirred reactor at a temperature of from about 200° C. to about 285° C., under a vacuum of from about 10 mm to about 0.1 Torr, in the presence of a catalyst comprising, from about 50 to about 400 ppm of Sb, or from about 10 to about 200 ppm of Ti, or mixtures thereof.

3. The process of claim 1 wherein the polycondensation is carried out in a solid state, fixed-bed reactor at a temperature of from about 200° C. to below the sticking point of the polymer, in the presence of a catalyst comprising from about 50 to about 400 ppm of Sb, or from about 10 to about 200 ppm of Ti, or mixtures thereof.

* * * * *

UNITED STATES PATENT AND TRADEMARK OFFICE
CERTIFICATE OF CORRECTION

PATENT NO. : 4,594,406
DATED : June 10, 1986
INVENTOR(S) : Joelle R. Thomsen and David R. Fagerburg It is certified that error appears in the above-identified patent and that said Letters Patent is hereby corrected as shown below:

Column 11, line 29, "mixture" should read --- mixtures ---.

Column 12, line 14, "selectd" should read --- selected ---.

Column 12, line 32, "1-8" should read --- 1-18 ---.

Column 12, line 36, the word --- wherein --- should be inserted following the words "claim 1".

Signed and Sealed this

Ninth Day of September 1986

[SEAL]

*Attest:*

DONALD J. QUIGG

*Attesting Officer*  *Commissioner of Patents and Trademarks*